US010280957B2

(12) United States Patent
Mutch et al.

(10) Patent No.: US 10,280,957 B2
(45) Date of Patent: May 7, 2019

(54) CAM LOCK MECHANISM (71) Applicant: Helen of Troy Limited, Belleville, St. Michael (BB)

(72) Inventors: Martin Mutch, New York, NY (US); Lingxiu Wu, Brooklyn, NY (US); Conor P. McNamara, Montclair, NJ (US); Morris Elijah Worden, IV, Queens, NY (US); Mason Adam Umholtz, Brooklyn, NY (US); Brett Andler, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 589 days.

(21) Appl. No.: 15/136,258

(22) Filed: Apr. 22, 2016

(65) Prior Publication Data
US 2017/0306995 A1    Oct. 26, 2017

(51) Int. Cl.
*F16B 2/18*        (2006.01)
*A47K 3/28*        (2006.01)

(52) U.S. Cl.
CPC .............. *F16B 2/185* (2013.01); *A47K 3/281* (2013.01)

(58) Field of Classification Search
CPC ...... F16B 2/04; F16B 2/14; F16B 2/18; F16B 2/185; A45D 42/16; A47K 10/12; A47K 10/14

See application file for complete search history.

(56) References Cited

U.S. PATENT DOCUMENTS

| 4,390,201 | A | | 6/1983 | Saunders | |
|---|---|---|---|---|---|
| 5,087,005 | A | | 2/1992 | Holoff | |
| 5,312,402 | A | * | 5/1994 | Schlapfer | A61B 17/645 606/267 |
| 6,113,042 | A | | 9/2000 | Welsch et al. | |
| 7,758,502 | B2 | * | 7/2010 | Phillips | F16B 7/0433 248/229.2 |
| 8,020,260 | B2 | * | 9/2011 | Franklin | F16B 2/14 24/346 |
| 8,176,693 | B2 | * | 5/2012 | Abbott | F16B 2/185 52/173.3 |
| 8,225,946 | B2 | | 7/2012 | Yang et al. | |

(Continued)

FOREIGN PATENT DOCUMENTS

EP        2944240 A1 * 11/2015 ............. A47K 10/10

OTHER PUBLICATIONS

International Search Report filed in PCT/US2017/023142 dated Jul. 18, 2017.

*Primary Examiner* — Jonathan P Masinick
(74) *Attorney, Agent, or Firm* — Rankin, Hill & Clark LLP (57) ABSTRACT

A cam lock mechanism for use with an associated consumer product includes a base member defining a receptacle. A cam member is received in the receptacle of the base member. The cam member has an engaged position wherein the cam member is configured to be non-movably fixed relative to the associated consumer product and a released position wherein the cam member is configured to be movable relative to the associated consumer product. A lever is hingedly connected to the cam member. The lever has a closed position wherein the lever is configured to move the cam member into the engaged position and an opened position wherein the cam member is in the released position.

18 Claims, 10 Drawing Sheets

(56) References Cited

U.S. PATENT DOCUMENTS

| | | | |
|---|---|---|---|
| 8,371,002 B2* | 2/2013 | Franklin | F16B 2/14 24/346 |
| 8,746,901 B1 | 6/2014 | Zadro | |
| 8,858,001 B2 | 10/2014 | Parisi et al. | |
| 9,004,415 B2* | 4/2015 | Fukumoto | F16B 19/1081 248/51 |
| 9,522,693 B2* | 12/2016 | Tomaru | B62D 1/184 |
| 9,602,902 B2* | 3/2017 | Kieltyka | H04R 1/026 |
| 9,695,908 B2* | 7/2017 | Somerfield | F16G 11/108 |
| 2006/0284043 A1 | 12/2006 | Paradise | |
| 2007/0246519 A1 | 10/2007 | Turvey | |
| 2009/0206215 A1 | 8/2009 | Tooley | |
| 2012/0001042 A1 | 1/2012 | Zhong | |
| 2012/0112023 A1 | 5/2012 | Tollman | |
| 2014/0084118 A1 | 3/2014 | Tooley | |
| 2015/0230638 A1 | 8/2015 | Jagger | |

* cited by examiner

CAM LOCK MECHANISM

BACKGROUND

The present disclosure relates to a cam mechanism for an associated consumer product which allows for selective adjustment of one part of the consumer product relative to another part of the consumer product.

SUMMARY

According to one aspect, a cam lock mechanism for use with an associated consumer product comprises a base member defining a receptacle. A cam member is received in the receptacle of the base member. The cam member has an engaged position wherein the cam member is configured to be non-movably fixed relative to the associated consumer product and a released position wherein the cam member is configured to be movable relative to the associated consumer product. A lever is hingedly connected to the cam member. The lever has a closed position wherein the lever is configured to move the cam member into the engaged position and an opened position wherein the cam member is in the released position.

According to another aspect, a method of using a cam lock mechanism on a consumer product is provided. The cam lock mechanism has a cam member and a lever hingedly connected to the cam member. The method comprises placing the lever in an opened position; mounting an engagement member of the cam member on the consumer product; positioning the cam member at a desired location on the consumer product; moving the lever to a closed position; and pressing the engagement member into contact with the consumer product via the lever to non-movably secure the cam member at the desired position on the consumer product.

DETAILED DESCRIPTION

It should, of course, be understood that the description and drawings herein are merely illustrative and that various modifications and changes can be made in the structures disclosed without departing from the present disclosure. In general, the figures of the exemplary cam lock mechanism are not to scale. It will also be appreciated that the various identified components of the exemplary cam lock mechanism disclosed herein are merely terms of art that may vary from one manufacturer to another and should not be deemed to limit the present disclosure.

Figure 1:
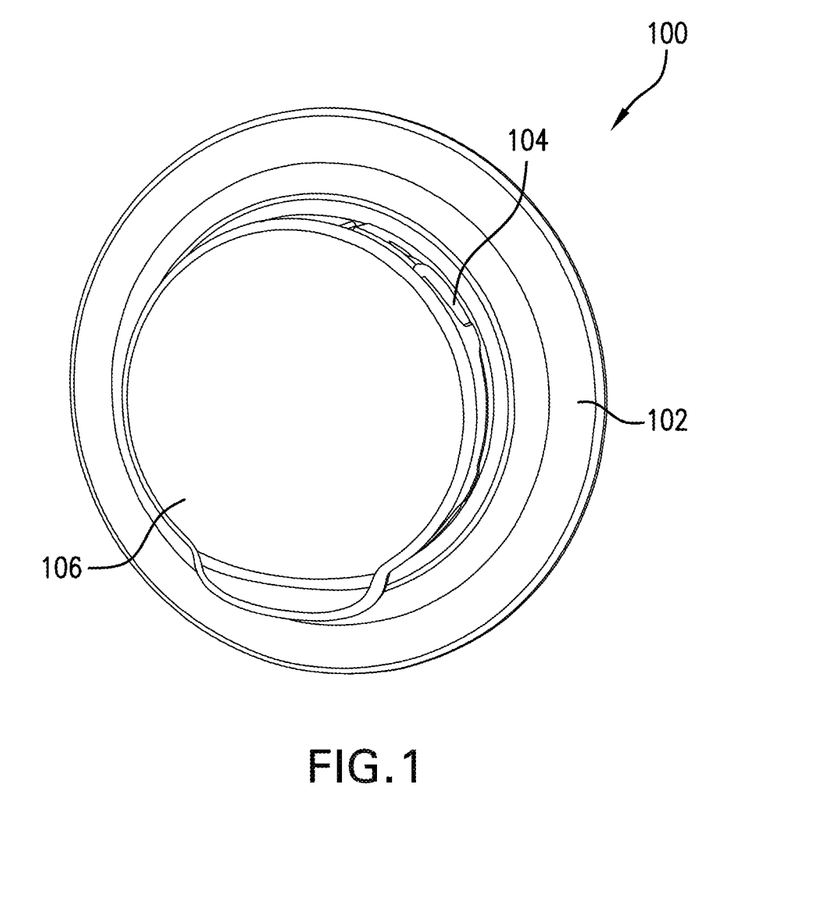
FIG. 1 is a perspective view of an exemplary cam lock mechanism for an associate consumer product according to the present disclosure.
Figure 2:
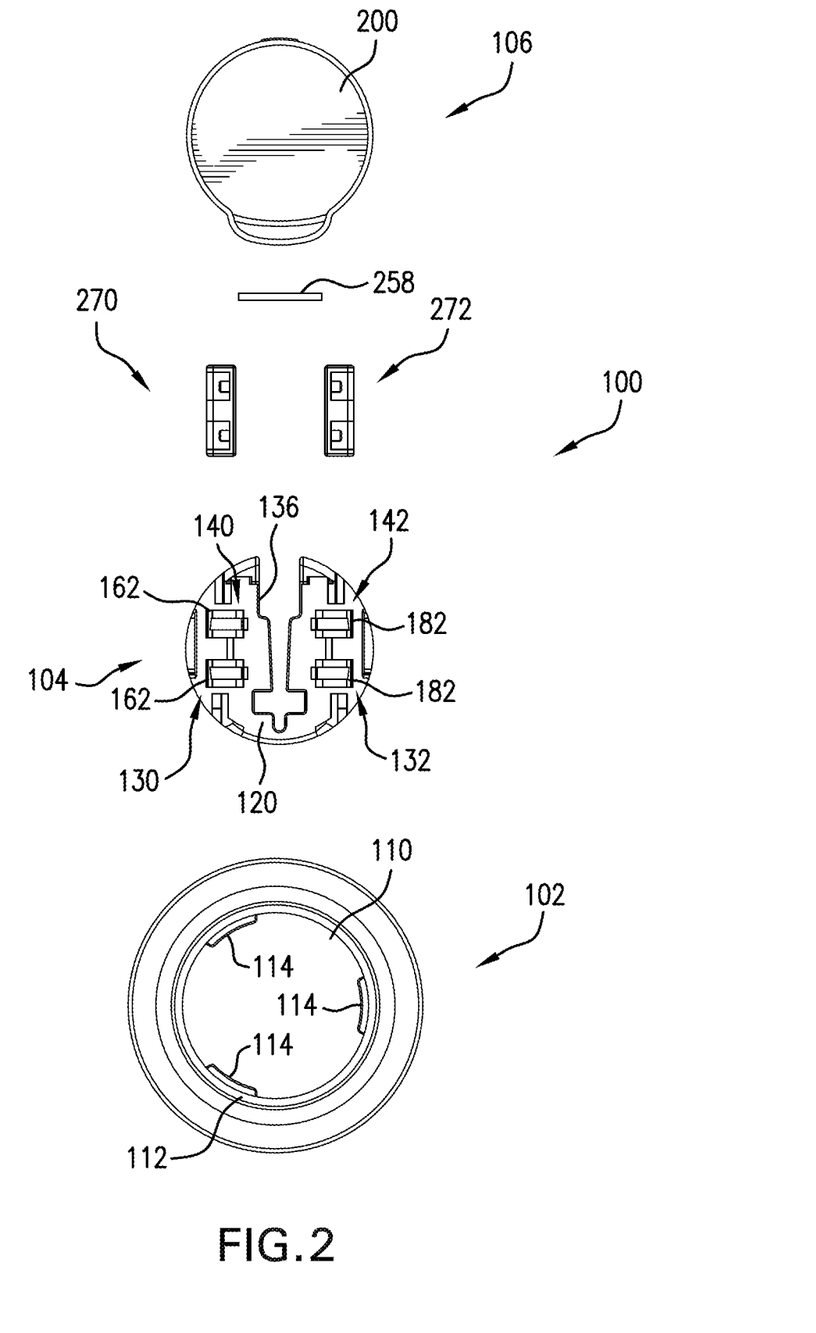
FIG. 2 is an exploded view of the cam lock mechanism.

Referring now to the drawings, wherein like numerals refer to like parts throughout the several views, FIGS. 1 and 2 illustrate an exemplary cam lock mechanism 100 according to the present disclosure for use with an associated consumer product. The cam lock mechanism 100 generally includes a base member 102, a cam member 104 connected to the base member 102 and a lever 106 hingedly connected to the cam member 104. As will be discussed below, the cam member 104 has an engaged position wherein the cam member 104 is configured to be non-moveably fixed to the consumer product and a released position wherein the cam member 104 is configured to be moveable relative to the consumer product. This allows for selective adjustment of one part of the consumer product relative to another part of the consumer product. The lever 106 has a closed position wherein the lever is configured to move the cam member 104 into the engaged position and an opened position wherein the cam member 104 is in the released position.

Figure 13:
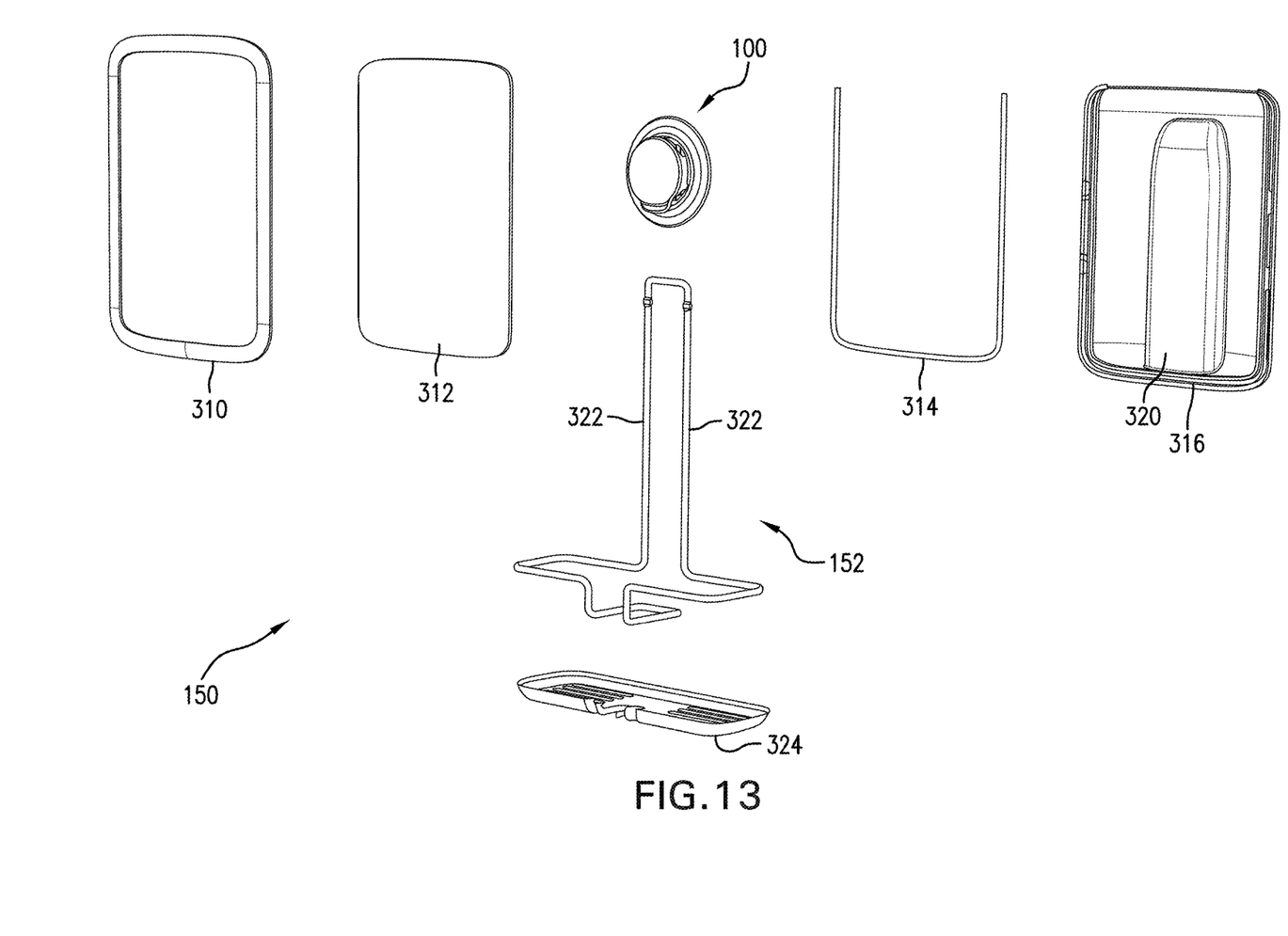
FIG. 13 is an exploded view of a consumer product (e.g., a fogless mirror) having the exemplary cam lock mechanism.

Depending on the type of consumer product, the base member 102 can be configured to be releasably secured to an associated support surface (not depicted). For example, as shown in FIG. 13 the consumer product is a fogless mirror 150 and the base member 102 can be configured to be releasably secured to a surface of a wall. In the depicted embodiments, the base member 102 can be circular in shape; although, it should be appreciated that alternative configurations for the base member which allow the base member to be releasably secured to the associated support surface are contemplated. With reference to FIG. 2, the base member 102 defines a receptacle 110 sized to receive the cam member 104. According to one aspect, the base member 102 includes an annular flange 112 extending outwardly therefrom. The annular flange 112 defines the receptacle 110. Further, circumferentially spaced on the annular flange 112 are inwardly extending tabs 114 which cooperate with the cam member 104 to secure the cam member 104 within the receptacle 110 but allow for rotation of the cam member 104 within the receptacle 110.

Figure 14:
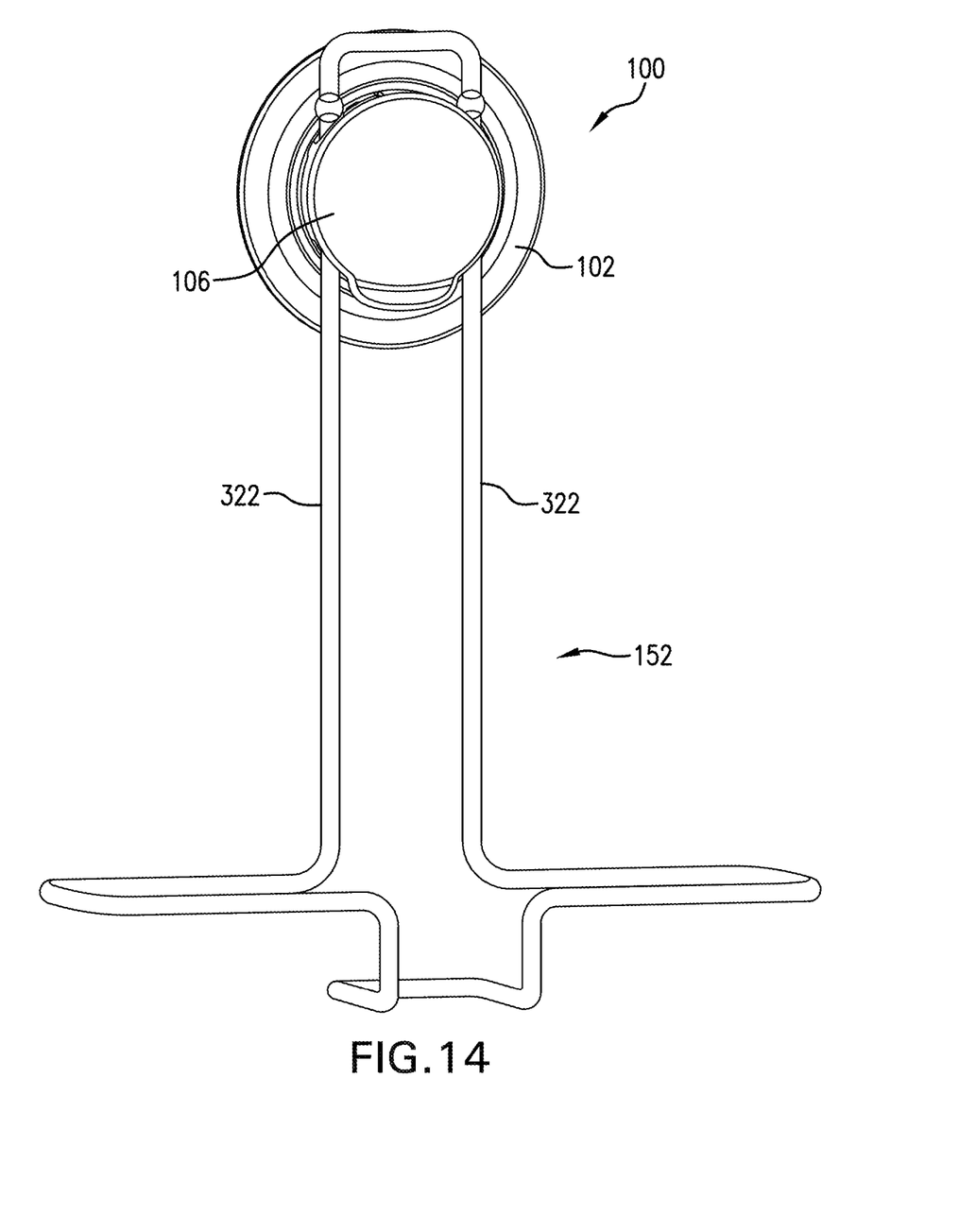
FIGS. 14 and 15 are perspective views of the cam lock mechanism mounted to a wire frame of the consumer product (FIG. 15 not showing the lever).
Figure 15:
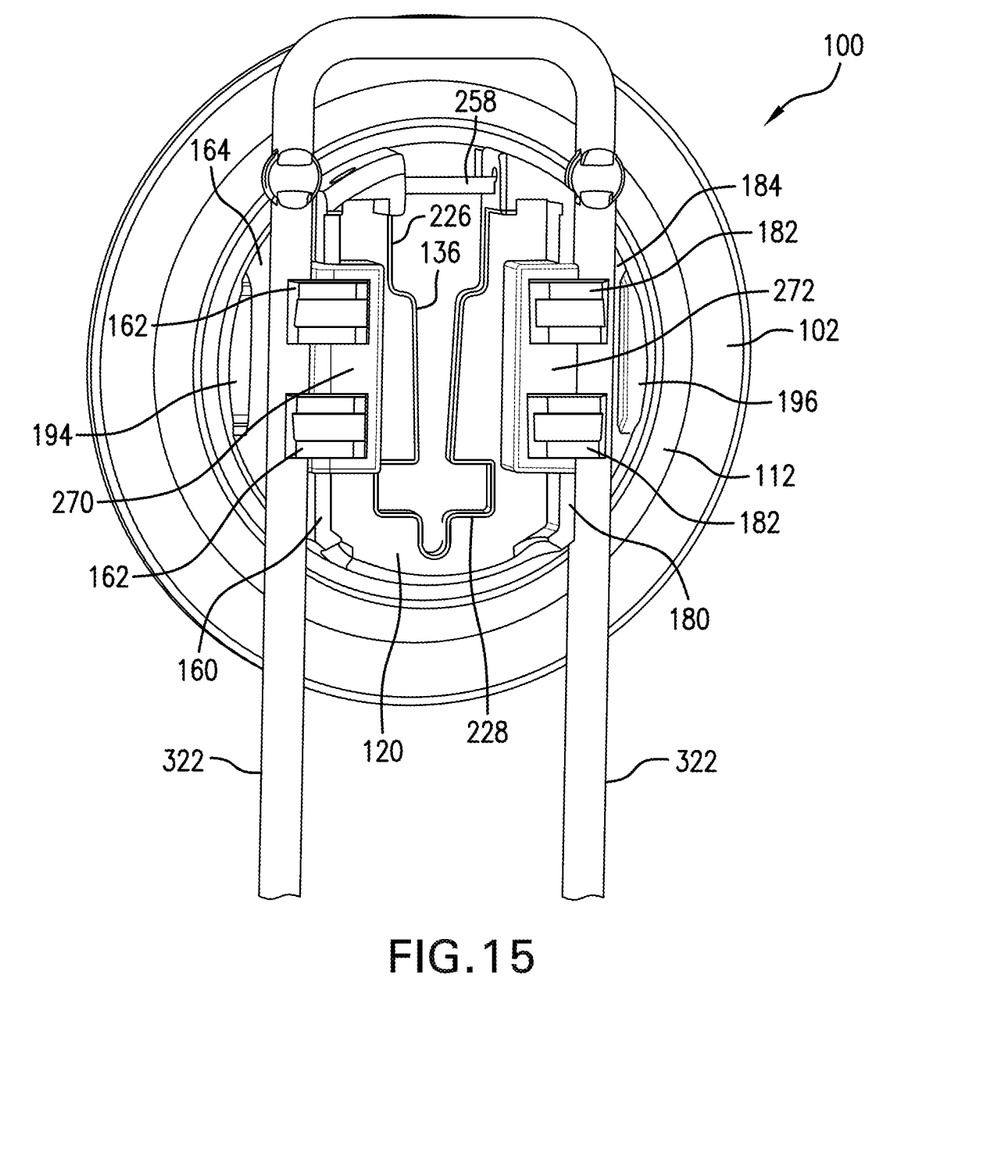

As best depicted in FIGS. 5-8, the exemplary cam member 104 includes a base 120 which is rotatably received within the receptacle 110 of the base member 102. With the receptacle 110 being defined by the annular flange 112, the cam member 104 includes a corresponding annular flange 122 extending outwardly from an underside of the base 120. The flange 122 is engaged by the tabs 114 and is sized so that an upper surface of the base 120 is contiguous with an outer surface of the flange 112 of the base member 102. The cam member 104 includes at least one section which is adapted to be moved into engagement with the associated consumer product as the cam member is moved into the engaged position. To at least partially allow for this movement of the at least one section, the flange 122 can include cutouts 124, 126. In the illustrated embodiment, the at least one section of the cam member 104 includes a first section 130 and a second section 132. According to one aspect, the first and second sections 130, 132 are formed as one piece and are at least partially separated by an elongated cutout 136 provided on the base 120 of the cam member 104, the cutout 136 being aligned with at least the cutout 124. According to another aspect, the first and second sections 130, 132 can be formed as two or more pieces which are hingedly connected. Each of the first and second sections 130, 132 is adapted to be moved into engagement with the consumer product. According to one aspect, the first section 130 includes a first engagement member 140 and the second section 132 includes a second engagement member 142, each of the first and second engagement members 140, 142 is configured to at least partially receive/engage a part of the consumer product. It should be appreciated that the configuration of each of the first and second engagement members 140, 142 is dependent on the consumer product to which the exemplary cam lock mechanism 100 is mounted to. By way of example, FIGS. 13-15 depict the exemplary cam lock mechanism 100 provided with the fogless mirror 150. The fogless mirror 150 includes a frame, for example the depicted wire frame 152, and the first and second engagement members 140, 142 are configured to at least partially receive/engage the wire frame 152. Accordingly, the hereafter description of the features of the first and second engagement members 140, 142 is directed to exemplary cam lock mechanism 100 being mounted to the wire frame 152. Again, it should be appreciated that the first and second engagement members 140, 142 can be configured for engagement to particular parts of consumer products to which the cam lock mechanism 100 is mounted thereon to allow for selective adjustment of one part of the consumer product.

In the depicted embodiment the first engagement member 140 is defined by a first shoulder 160 extending outwardly from the base 120 and at least one first tab 162. The first shoulder 160 and at least one first tab 162 together at least partially define a channel 164 dimensioned to at least partially receive the wire frame 152. According to one aspect, the at least one first tab 162 is a pair of spaced first tabs 162 which have a generally inverted L-shape, each first tab 162 including a first section 170 extending outwardly from the base 120 and a second section 172 extending from the first section 170. Similarly, the second engagement member 142 includes a second shoulder 180 extending outwardly from the base 120 and at least one second tab 182 which together at least partially define a second channel 184 dimensioned to at least partially receive the wire frame 152. Again, the at least one second tab 182 can be a pair of second tabs 182 each having a generally inverted L-shape and including a first section 190 extending outwardly from the base 120 and a second section 192 extending from the first section 190. To accommodate the pairs of first and second tabs 162, 182, the shoulder 160 includes cutouts sized to receive the first sections 170 of the first tabs 162 and the second shoulder 180 includes cutouts sized to receive the first sections 190 of the second tabs 182. Each of the first and second engagement members 140, 142 can be further defined by respective third and fourth shoulders 194, 196 which are spaced outwardly from the respective first and second shoulders 160, 180. The third and fourth shoulders 194, 196 can further define the first and second channels 164, 184.

Figure 3:
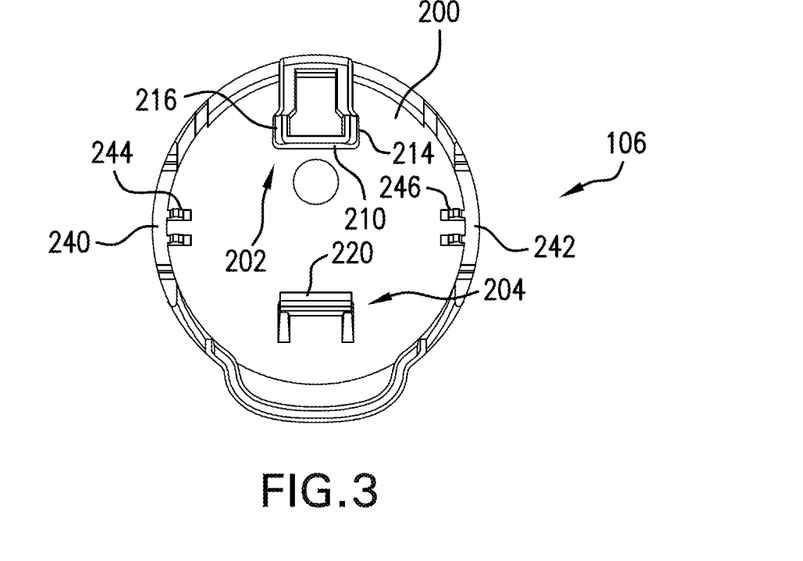
FIG. 3 is a back view of a lever of the cam lock mechanism.
Figure 4:
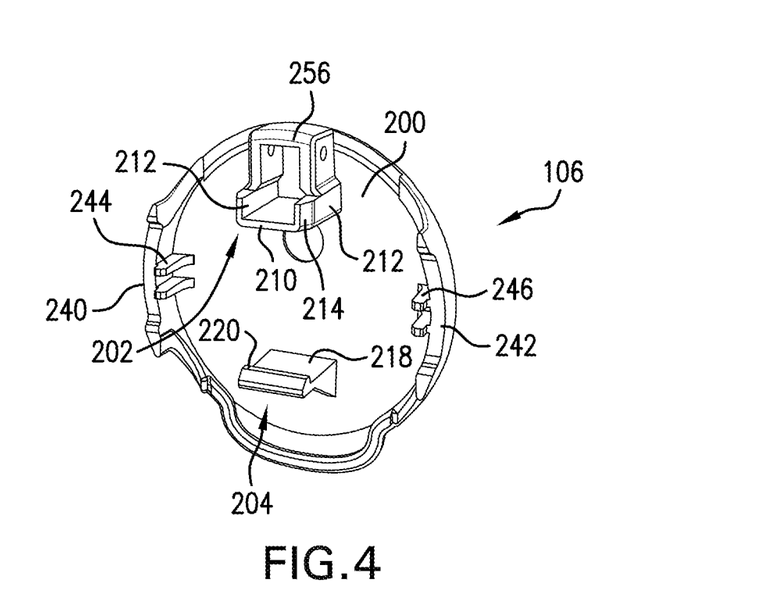
FIG. 4 is a perspective view of the lever of the cam lock mechanism.
Figure 5:
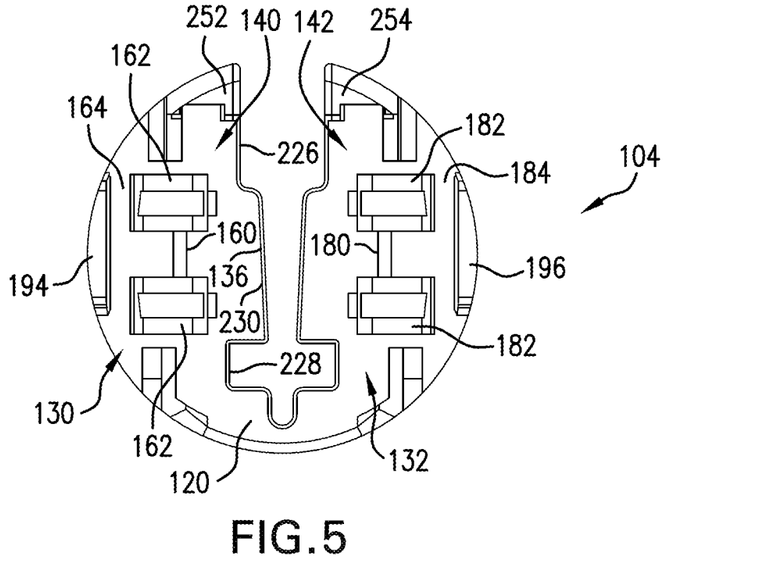
FIG. 5 is a front view of a cam member of the cam lock mechanism.
Figure 6:
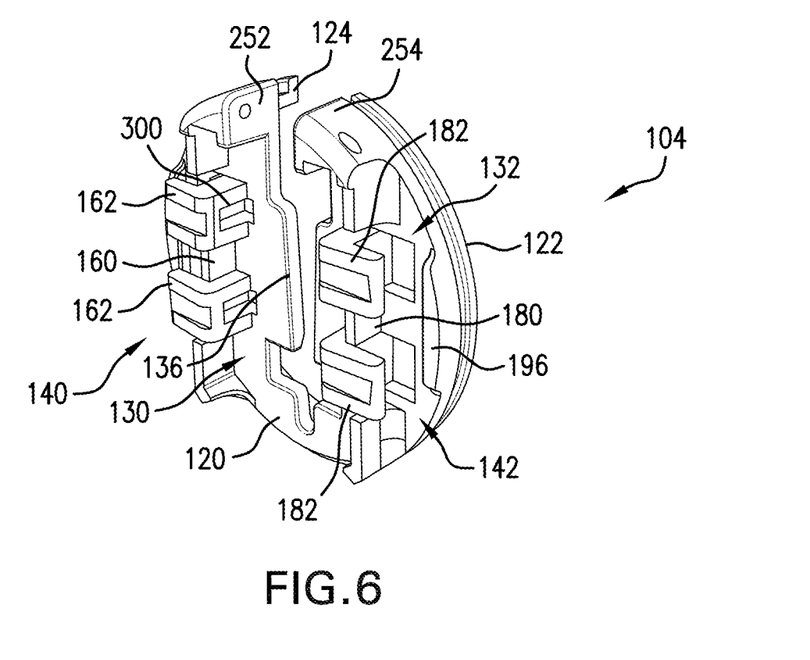
FIGS. 6-8 are perspective views of the cam member of FIG. 5.
Figure 7:
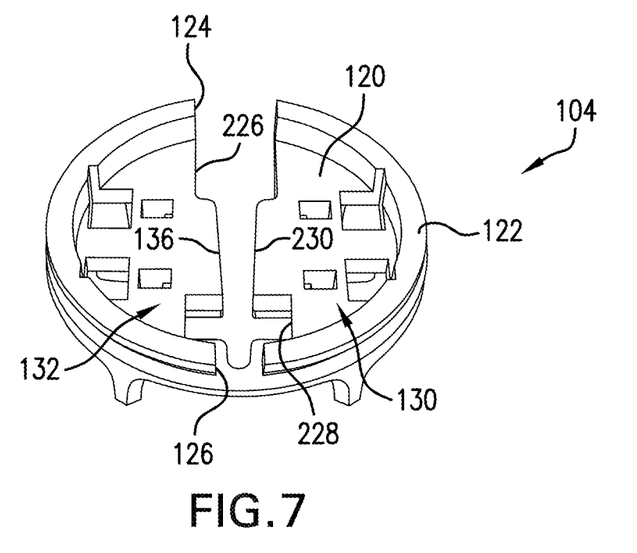
Figure 8:
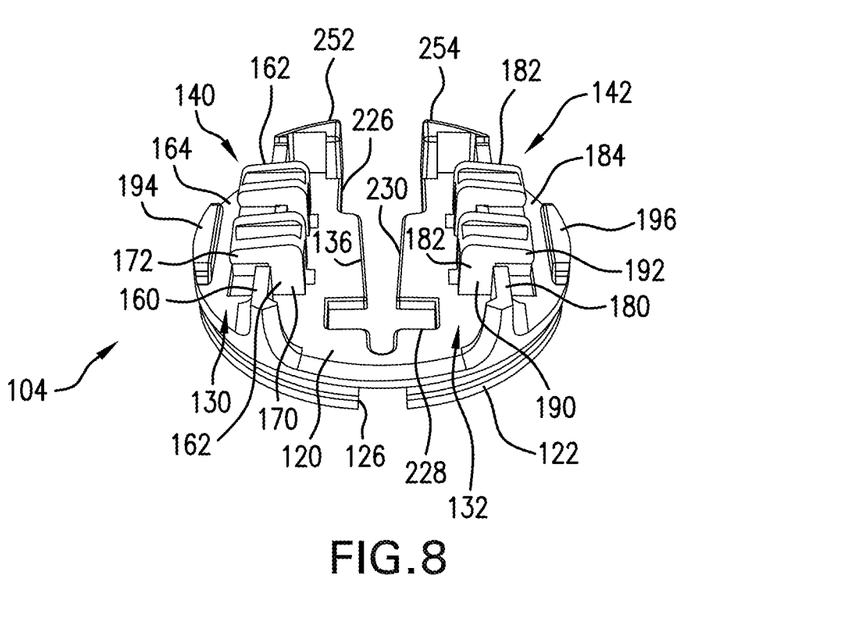

With reference now to FIGS. 3 and 4, the lever 106 includes a base 200 having a wedge portion 202 and a separate locking portion 204 each extending outwardly from an underside of the base 200. The wedge portion 202 is configured to engage the cam member 104 and move the first and second sections 130, 132 of the cam member away from one another and into secure engagement with the consumer product. In the depicted embodiment, the wedge portion 202 is defined by a base wall 210 and a pair of side walls 212 connected to the base wall 210. Each of the side walls 212 includes a chamfered end section 214. The locking portion 204 is generally check shaped having a base wall 218 and a tab 220 extending outwardly from an end of the base wall 218. With reference back to FIGS. 5-8, the elongated cutout 136 provided on the base 120 of the cam member 104 has a first end section 226 dimension to receive the wedge portion 202 of the lever 106, a second end section 228 dimension to receive the locking portion 204 of the lever 106, and a middle section 230 interconnecting the first and second end sections 226, 228. In the depicted embodiment, the first end section 226 is open, the second end section 228 is closed by a curved end wall, and the middle section 230 is generally V-shaped being larger at the first end section 226. The first end section 226 is aligned with the cutout 124 provided on the flange 122 of the base 120.

Figure 9:
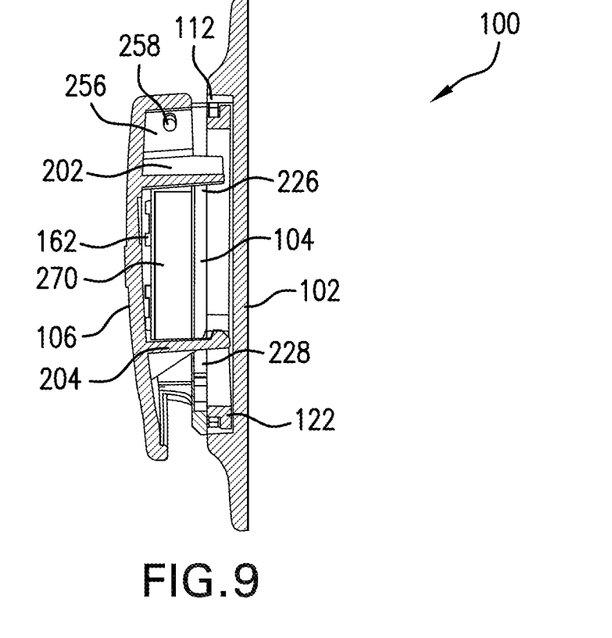
FIG. 9 is a cross-sectional view of the cam lock mechanism of FIG. 1.

As indicated previously, the wedge portion 202 includes the chamfered end sections 214 of the side walls 212, and as the lever 106 is moved toward its closed position the chamfered end sections 214 enlarge the first end section 226 of the cutout 136. This in turn moves the first and second sections 130, 132 of the cam member 104 away from one another and into engagement with the consumer product (e.g., the wire frame 152) being held by the first and second engagement members 140, 142. As the lever 106 is further moved to its closed position, the locking portion 204 is received in the second end section 228 of the cutout 136 and the tab 220 of the locking portion 204 engages the underside of the base 120, which maintains the lever 106 in the closed position (see FIG. 9).

Further provided on a periphery of the base 200 of the lever 106 are first and second walls 240, 242. The first wall 240 includes at least one first tab 244 and the second wall 242 includes at least one second tab 246. In the depicted embodiment, a pair of first tabs 244 is provided on the first wall 240 and a pair of second tabs 246 is provided on the second wall 242; although, this is not required. The first and second tabs 244, 246 are associated with the respective first and second sections 130, 132 of the cam member 104 and in the closed position of the lever 106 the first and second tabs 244, 246 are configured to engage the consumer product (e.g., the wire frame 152 held by the first and second engagement members 140, 142). As shown, the first and second tabs 244, 246 can be wedge-shaped and in the closed position of the lever 106 the first and second tabs 244, 246 are pressed between the respective third and fourth shoulders 194, 196 and the consumer product held by the first and second engagement members 140, 142.

Figure 10:
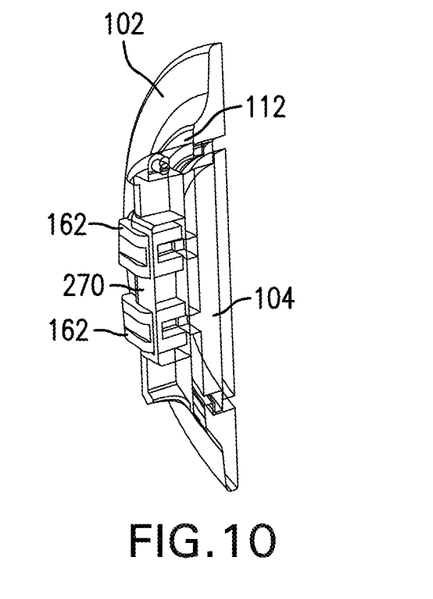
FIG. 10 is a cross-sectional view of the cam lock mechanism of FIG. 1 sans the lever.

As indicated previously, the lever 106 of the cam lock mechanism 100 is hingedly connected to the cam member 104. To provide for this connection, the cam member 104 includes first and second mounting portions 252, 254 which flank the first end section 226 of the cutout 136. A corresponding mounting portion 256 is provided on the underside of the lever 106 and in the depicted embodiment, the mounting portion 256 is connected with the wedge portion 202. The mounting portion 256 of the lever 106 is sized to be positioned between the first and second mounting portions 252, 254 of the cam member 104. Once properly positioned between the first and second mounting portions 252, 254 of the cam member a pin 258 (see FIGS. 9 and 10) extends through openings provided in the mounting portions 252, 254, 256 thereby hingedly connecting the lever 106 to the cam member 104.

Figure 11:
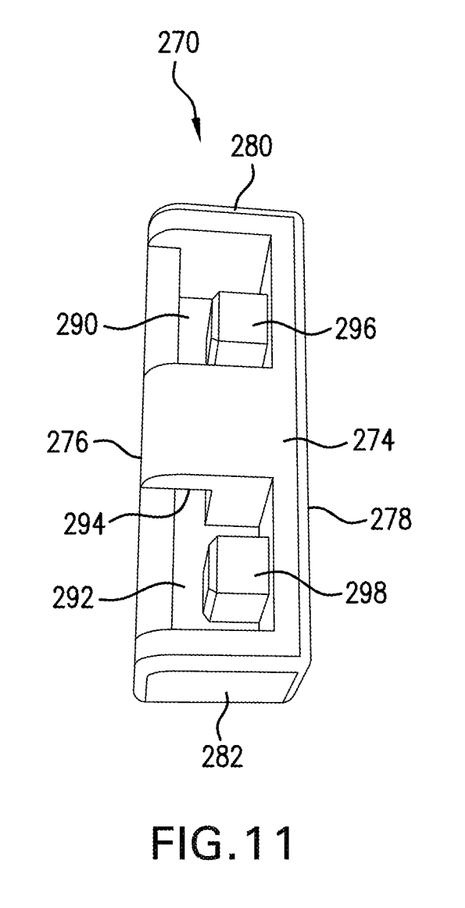
FIGS. 11 and 12 are perspective views of a compressible member of the cam lock mechanism.
Figure 12:
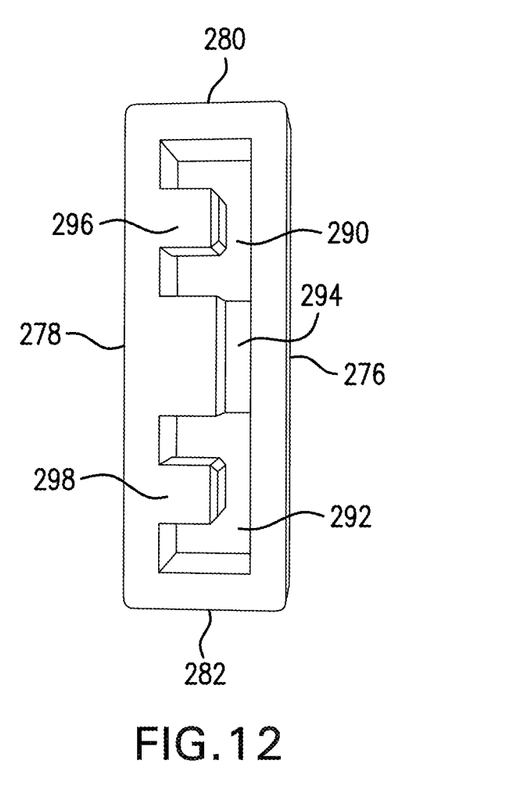

The exemplary cam lock mechanism 100 can further include first and second compressible members 270, 272 which are associated with the first and second engagement members 140, 142. The compressible members 270, 272, which can be formed of a silicone material, are configured to grip the consumer product engaged by the first and second engagement members 140, 142 (see FIG. 15). The first compressible member 270 is shown in FIGS. 11 and 12, and it should be appreciated that the first and second compressible members are identical in configuration. As shown, the first compressible member 270 includes a body 274 being generally rectangular in shape and having opposed side walls 276, 278 and opposed end walls 280, 282. The body 274 is sized to fit beneath the second sections 172 of the first tabs 162 such that the side wall 276 abuts the first shoulder 160 and the first sections 170 of the first tabs 162. The body 274 includes first and second cutouts 290, 292 and a lower channel 294 interconnecting the first and second cutouts 290, 292. Bumpers 296, 298 project from the side wall 278 into the respective first and second cutouts 290, 292 and are spaced from the side wall 276. To mount the first compressible member 270 to the first section 130 of the cam member 104, a part of the first shoulder 160 located between the first tabs 162 is received in the channel 294 and the bumpers 296, 298 are positioned in openings 300 (FIG. 6) provided in the second sections 172 of the first tabs 162.

With reference now to FIGS. 13-15, and by way of example only, the consumer product is the fogless mirror 150. The fogless mirror 150 generally includes the wire frame 152, a mirror frame 310, a mirror 312 fitted within the mirror frame 310, a gasket 314 and a reservoir 316. The mirror frame 310 is connected to the reservoir 316 with the gasket 314 located therebetween. The gasket 314 provides for a sealed connection between the mirror frame 310 and the reservoir 316. The reservoir 316 includes a mounting section 320 to which upright wires 322 of the wire frame 152 can be releasably connected. A tray 324 can be releasably mounted to a lower portion of the wire frame 152. In use, hot water can be poured into the reservoir 316 which prevents condensation from forming on the mirror 312.

The exemplary cam lock mechanism 100 is mounted on the upright wires 322 of the wire frame 152 with the upright wires being located in the first and second channels 164, 184 defined by the first and second engagement members 140, 142. The upright wires 322 are at least partially located beneath the first and second tabs 162, 182 of the first and second engagement members 140, 142. In the open position of the lever 106, the cam member 104 is in its released position which allows the cam member 104 to rotate within the receptacle 110 defined by the base member 102 and also allows the cam lock mechanism 100 to move along the upright wires 322. Moving the lever 106 to its closed position forces the wedge portion 202 into the first end section 226 of the elongated cutout 136 and due to the shape of the cutout 136, the wedge portion 202 presses the first and second sections 130, 132 (together with the first and second engagement members 140, 142) into the upright wires 322. This pressing movement of the first and second sections 130, 132 further compresses the first and second compressible members 270, 272 into the upright wires 322. In the locked position of the lever 106, the locking portion 204 is received in the second end section 228 of the elongated cutout 136, and in the engaged position of the cam member 104, the cam member 104 is prevented from rotation within the receptacle 110 of the base member 102 and the cam lock mechanism 100 is fixed in position on the wire frame 152. Accordingly, the exemplary cam lock mechanism 100 allows for movement of one part of the consumer product relative to another part of the consumer product and also fixes the one part relative to the other part.

As evident from the foregoing, the present disclosure provides a method of using the cam lock mechanism 100 on an associated consumer product. The exemplary method comprises placing the lever 106 in an open position; mounting the engagement member 140, 142 of the cam member 104 on the consumer product; positioning the cam member 104 at its desired position on the consumer product; moving the lever 106 to a closed position; and pressing the engagement member 140, 142 into contact with the consumer product via the lever to non-moveably secure the cam member 104 at the desired position on the consumer product. The positioning step can further include rotating the cam member 104. And the method can further include pressing each of the first and second engagement members 140, 142 into contact with the consumer product via the wedge portion 202 of the lever 106. Further the mounting step can include sliding the consumer product through the channels 164, 184 provided on the cam member 104 and the channels being at least partially defined by the engagement members 140, 142.

It should be appreciated that the fogless mirror 150 is by way of example only and the exemplary cam lock mechanism 100 can be configured for use on various consumer products. For example, the cam lock mechanism 100 can be configured for a stroller cart handle which allows the handle to slide out and rotate up and down to adjust to different user preferences when the cam member 104 is in its released position. When the lever 106 is moved into the closed position, the cam member 104 can be configured to fixedly engage the handle. The cam lock mechanism 100 can be configured for use with a grinder or rotary shredder. In this embodiment, the lever 106 serves as a handle which swings out during grinding/shredding and when the handle is pivoted down for storage (i.e., moved to the locked position) the cam member 104 can be configured to lock the internal mechanism of the grinder/shredder in place. The cam lock mechanism 100 can be provided with a hook feature on the lever 106 and mounted on a strap. The cam member 104 can be configured to engage the strap. In the released position of the cam member 104, the cam lock mechanism 100 can slide along the strap and when the lever 106 is moved to its closed position, the cam member 104 can be is locked at a predetermined position on the strap. The cam lock mechanism 100 can also be provided as a mount for an electronic device to hold the electronic device at a certain position on a stand. The cam lock mechanism 100 can further be provided as a lock on a cup holder which allows for both rotation and position when unlocked. When the lock is pressed down the cup holder cannot rotate or slide.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A cam lock mechanism for use with an associated consumer product comprising:
   a base member defining a receptacle;
   a cam member received in the receptacle of the base member, the cam member having an engaged position wherein the cam member is configured to be non-movably fixed relative to the associated consumer product and a released position wherein the cam mem- ber is configured to be movable relative to the associated consumer product; and a lever hingedly connected to the cam member, the lever having a closed position wherein the lever is configured to move the cam member into the engaged position and an opened position wherein the cam member is in the released position.

2. The cam lock mechanism of claim 1, wherein the base member is configured to be releasably secured to an associated support surface.

3. The cam lock mechanism of claim 1, wherein the base member includes an annular flange extending outwardly therefrom, the annular flange defining the receptacle.

4. The cam lock mechanism of claim 3, wherein the cam member is rotatable within the receptacle of the base member.

5. The cam lock mechanism of claim 1, wherein the cam member includes at least one section adapted to be moved into engagement with the associated consumer product.

6. The cam lock mechanism of claim 5, wherein the at least one section of the cam member includes a first section and a second section at least partially separated from the first section by an elongated cutout provided on the cam member, each of the first and second sections adapted to be moved into engagement with the associated consumer product.

7. The cam lock mechanism of claim 6, wherein the first section includes a first engagement member and the second section includes a second engagement member, each of the first and second engagement members configured to at least partially receive the associated consumer product.

8. The cam lock mechanism of claim 7, wherein the associated consumer product includes an associated wire frame, and each of the first and second engagement members is defined by a shoulder and at least one tab which together at least partially define a channel dimensioned to at least partially receive the associated wire frame.

9. The cam lock mechanism of claim 8, wherein each of the first and second engagement members is further defined by a second shoulder spaced outwardly from each shoulder of the first and second engagement members.

10. The cam lock mechanism of claim 7, wherein each of the first and second engagement members further includes a compressible member configured to grip the associated consumer product.

11. The cam lock mechanism of claim 6, wherein the lever includes a wedge portion configured to engage the cam member and move the first and second sections of the cam member away from one another.

12. The cam lock mechanism of claim 11, wherein the lever includes first and second tabs associated with the respective first and second sections and in the closed position of the lever the first and second tabs are configured to engage the associated consumer product.

13. The cam lock mechanism of claim 11, wherein the lever includes a locking portion configured to engage the cam member and maintain the lever in the closed position.

14. The cam lock mechanism of claim 13, wherein the elongated cutout has a first end section dimensioned to receive the wedge portion of the lever, a second end section dimensioned to receive the locking portion of the lever, and a generally V-shaped section interconnecting the first and second end sections.

15. A method of using a cam lock mechanism on a consumer product, the cam lock mechanism having a cam member and a lever hingedly connected to the cam member, the method comprising:

placing the lever in an opened position;

mounting an engagement member of the cam member on the consumer product;

positioning the cam member at a desired location on the consumer product;

moving the lever to a closed position; and pressing the engagement member into contact with the consumer product via the lever to non-movably secure the cam member at the desired position on the consumer product.

16. The method of claim 15, wherein the positioning step includes rotating the cam member.

17. The method of claim 15, wherein the cam member includes first and second engagement members, the lever includes a wedge member, and the method includes pressing each of the first and second engagement members into contact with the consumer product via the wedge member of the lever.

18. The method of claim 15, wherein the mounting step includes sliding a part of the consumer product through a channel provided on the cam member, the channel being at least partially defined the engagement member.

* * * * *